United States Patent [19]

Murphy

[11] 4,278,579

[45] Jul. 14, 1981

[54] AQUEOUS COATING SYSTEMS CONTAINING BISPHENOL-FORMALDEHYDE ETHERS

[75] Inventor: Edward J. Murphy, Mt. Prospect, Ill.

[73] Assignee: DeSoto, Inc., Des Plaines, Ill.

[21] Appl. No.: 63,715

[22] Filed: Aug. 6, 1979

[51] Int. Cl.$^3$ .............................................. C08L 61/12
[52] U.S. Cl. ............................... 260/29.3; 204/181 R; 204/181 C; 260/29.6 NR
[58] Field of Search ..................... 260/29.3, 29.6 NR; 204/181 C; 525/142; 528/129

[56] References Cited

U.S. PATENT DOCUMENTS

| | | | |
|---|---|---|---|
| 2,866,763 | 12/1958 | Sanders | 260/29.3 |
| 3,455,806 | 7/1969 | Spoor | 204/181 |
| 3,729,435 | 4/1973 | Bachmann et al. | 204/181 C |
| 4,002,582 | 1/1977 | Fritsche | 525/142 |
| 4,129,544 | 12/1978 | Craig | 204/181 C |

*Primary Examiner*—Theodore E. Pertilla
*Attorney, Agent, or Firm*—Dressler, Goldsmith, Shore, Sutker & Milnamow, Ltd.

[57] ABSTRACT

Aqueous coating compositions which cure on baking and which are especially adapted for cationic electrocoating comprise an aqueous dispersion of a reactive resin solubilized by salt formation, especially an amine-functional copolymer solubilized with an acid, and a water insoluble bisphenol-formaldehyde ether is used as the curing reactant for the reactive resin.

14 Claims, No Drawings

AQUEOUS COATING SYSTEMS CONTAINING BISPHENOL-FORMALDEHYDE ETHERS

DESCRIPTION

1. Technical Field

This invention relates to aqueous coating systems which cure on baking, and particularly to the electrodeposition of resin salts from an aqueous bath together with a water dispersible curing agent in order to deposit films which cure on baking to provide superior properties.

2. BACKGROUND ART

The electrodeposition of resin salts from aqueous dispersion is well known, and it is common to disperse water insoluble aminoplast resin ethers in the aqueous dispersion in order that the aminoplast resin might codeposit with the resin ions so as to be present in the deposited film where it functions as a curing reactant for the resin.

The electrodeposition may take place at either the anode or the cathode, but in either event, the water insoluble aminoplast resin eiter is dragged along to be codeposited with the resin which was dispersed by salt formation. In a typical anodic system, the resin includes carboxyl groups which are reacted with a volatile amine to form salt groups which permit dispersion in water. These salt groups ionize in the aqueous medium to provide a polyanionic resin which becomes associated with the dispersed particles of water insoluble aminoplast resin ether so that the two deposit together on the anode. In a typical cathodic system the resin includes amine groups which are reacted with a solubilizing acid to form salt groups which permit dispersion in water. Ionization then provides a polycationic resin which becomes associated with the dispersed particles of water insoluble aminoplast resin ether so that the two resins deposit together on the cathode. Heat then causes the methylol groups on the aminoplast resin to react with functional groups on the resin salt for cure.

Water soluble aminoplast resins, such as dimethylol urea or hexamethoxymethyl melamine, are not satisfactory because they do not adequately associate with the resin salt, so the codeposit is not proportional to the ratio of resins in the bath. The partial etherification of hexamethoxy methyl melamine with ethanol or the use of benzoguanamine-formaldehyde ethers have provided water insoluble aminoplast resins which codeposit well with the resin ions, but the cured products are not fully adequate. The melamine resin ethers fail to provide desired detergent and corrosion resistance, and while the benzoguanamine resins are better in these respects, they are more costly.

The problem is particularly acute with the cationic systems where the curing temperature which is required is excessive in order to force the reaction between the N-methylol groups and the reactive groups in the resin in the alkaline environment provided by the amine functionality in the cationic resin.

Phenol-formaldehyde condensates have also been tried, but these discolor badly in the cationic systems, and the detergent and corrosion resistance is still not fully adequate.

DISCLOSURE OF INVENTION

This invention is directed to providing aqueous coating compositions which cure on baking to possess improved corrosion and detergent resistance and which cure at lower temperature in combination with cationic resins. This is accomplished herein by using water insoluble bisphenol-formaldehyde ethers as the curing reactant in combination with a resin salt having functional groups reactive with the etherified methylol groups on the bisphenol formaldehyde ether. While such bisphenol-formaldehyde ethers are broadly known, their use in aqueous medium in combination with reactive resins solubilized by salt formation has not been contemplated.

The prior failure to use bisphenol-formaldehyde ethers in aqueous coating systems in combination with reactive resin salts may be attributed to several factors. First, the aminoplast resins have dominated this area of commerce and the phenolic resins have introduced difficulty, so superior results did not appear to be obtainable by exploring phenolic options. Second, extensive etherification is needed to reduce the water solubility of the bisphenol-formaldehyde adducts, and this normally produces significant polymerization which is inconsistent with water application. Also, the existing production of bisphenol-formaldehyde ethers leads to extensive salt contamination, and this is discouraging to any effort to use the products in an electrocoating bath where significant salt contamination can not be tolerated.

Being of the opinion that bisphenol-formaldehyde adducts could be converted to water insoluble ethers which would be particularly effective in aqueous medium in combination with reactive resin salts, I requested that an effort be made to provide such ethers and the preparation of these products is described in the copending application of K. Sekmakas and T. Plaisance filed Jan. 22, 1979, Ser. No. 5,192 which is commonly owned with the present application. The disclosure of this copending application is hereby incorporated by reference.

A feature of this invention is the use of $C_4$–$C_8$ alcohol ethers of the bisphenol-formaldehyde adducts. These long chain ethers would be expected to prevent dispersibility in the aqueous resin salt solution or dispersion, but they are stably dispersible nonetheless. The longer chain ether groups volatilize on baking and the deposited films flow out better as these long chain alcohols are released. Butylation of the prior curing reactants would prevent water dispersibility.

Referring more particularly to the disclosure of the Sekmakas and Plaisance application, a bisphenol is reacted with formaldehyde in solution in alcohol in the presence of an alkali metal hydroxide at a pH of from 7–10. This provides a polymethylol derivative (a tetramethylol derivative if methylolation is complete). Nitric acid is then added to provide an acid pH, preferably in the range pH 1–3. The alcohol is desirably in excess, and the acidic mixture is heat reacted to remove the water of etherification, normally as an azeotrope with some of the excess alcohol. When the desired etherification is obtained, excess alcohol is distilled off, desirably to a solids content of 60% to 80%, and the nitric acid catalyst is reacted with alkali metal hydroxide which precipitates the nitrate to permit removal by filtration. This provides a bisphenol-formaldehyde ether with very little polymerization and which is water insoluble when the alcohol etherification is sufficient. Of course, the more hydrophobic the alcohol, the less etherification is needed to prevent water solubility.

The term "bisphenol", as is known, identifies a pair of phenolic groups bonded together by an intervening divalent aliphatic hydrocarbon group. The preferred compound is bisphenol A which has the formula

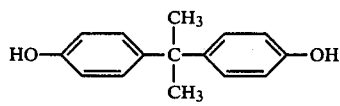

The bisphenol is preferably tetrafunctional and is reacted with formaldehyde to produce at least two and preferably at least three methylol groups.

While any alcohol may be used, $C_4$-$C_8$ alkanols are preferred, most particularly a butanol such as n-butanol or isobutanol, for reasons which have been explained.

The alkali metal hydroxide is preferably sodium hydroxide, and the bisphenol-formaldehyde ethers are normally used in an amount of from 5-50% of the total resin solids.

Referring more particularly to the reactive resins which are dissolved or dispersed in the aqueous medium in the form of salts, two types of resins are particularly contemplated. First, carboxyl functional solution copolymers containing from 5% to 35% of copolymerized monoethylenically unsaturated carboxylic acid, such as acrylic acid. These are reacted with volatile bases, like dimethyl ethanol amine, to provide water dispersibility by salt formation. Second, amine-functional solution copolymers containing from 5% to 35% of copolymerized monoethylenically unsaturated amine, preferably a tertiary amine like dimethyl aminoethyl methacrylate or dimethyl aminopropyl methacrylamide.

The copolymers are normally produced by copolymerization in organic solvent solution to produce a soluble copolymer primarily constituted by monoethylenically unsaturated monomers, such as styrene, vinyl toluene, methyl methacrylate, methyl acrylate, ethyl acrylate, n-butyl and isobutyl acrylate or methacrylate, dibutyl maleate, acrylonitrile, and the like.

Reactive monomers are also present, these being primarily hydroxy functional monomers illustrated by hydroxy alkyl acrylates and methacrylates in which the alkyl group normally contains from 2-4 carbon atoms. Hydroxy ethyl acrylate supplies a primary hydroxy group and is preferred. These reactive monomers may constitute from 5% to 40%, preferably from 10% to 30%, of the weight of the copolymer. Amide monomers are also useful, such as acrylamide. Broadly, any functional group which is reactive with the methylol group may be used for cure with the selection of the specific functional group being of secondary interest to this invention.

For normal coating utility, the water solutions or dispersions will have a resin solids content of from 20% to 40% by weight, but with greater dilution, down to about 5% to 15%, electrocoating baths are provided, and these are a feature of this invention.

BEST MODE FOR CARRYING OUT THE INVENTION

EXAMPLE 1

| Grams | Component |
|---|---|
| 800 | Bisphenol A |
| 520 | Paraformaldehyde |
| 1800 | Butanol |

-continued

| Grams | Component |
|---|---|
| | Carge into reactor. Set reflux condenser and start agitation. Then add the following: |
| 3 | Sodium hydroxide |
| 3 | Deionized water |
| | Heat to 110° C. and hold for 2 hours. Cool to 35° C. and add the following slowly to the reactor over 10 minutes |
| 8 | Nitric acid (70%) |
| 24 | Butanol |
| | Set empty trap to collect water. Heat to 110° C. and collect 200 grams of water. Then cool to 80° C. Set vacuum pump to remove butanol. Distill off 1428 grams of butanol. Start cooling to 60° C. Then add: |
| 390 | Isopropanol |
| | Filter using filter aid to provide a solution having a solids content of 73.6%, a viscosity (Gardner) of V, and a Gardner-Holdt color of 3-4. It is dispersible in water containing dissolved amine-functional copolymer salt with a solubilizing acid. |

EXAMPLE 2

| Grams | Component |
|---|---|
| 250 | 2-butoxy ethanol |
| 70 | Dimethylol propionic acid |
| | The above are charged to a reactor and heated to 95° C. to form a heel of solution in which the polymerization is carried out. |
| 355 | Styrene |
| 180 | 2-hydroxy ethyl acrylate |
| 165 | Dimethyl aminoethyl methacrylate |
| 315 | Butyl acrylate |
| 18 | azobisisobutyronitrile |

These are premixed and added to the heel of acid containing solvent slowly over a 3 hour period while maintaining 90° C. When this addition is finished, most of the polymerization has been completed and excessive viscosity is avoided by adding 150 grams of 2-butoxy ethanol. Then, and to insure completion of reaction, 3 grams of azobisisobutyronitrile is added and the temperature is maintained at 90° C. for one hour, and this procedure is repeated two more times at which point the conversion of monomer to polymer is complete and 90 grams of 2-butoxy ethanol is added to thin the solution. 2400 grams of deionized water is then added with rapid agitation to provide an aqueous bath having a nonvolatile content of 26.5%, a pH of 6.8 and an amine value (theoretical) of 58 based on solids. The bath is a milky dispersion, and it is stable.

EXAMPLE 3

The acrylic copolymer of Example 2 was combined with the bisphenol-formaldehyde ether of Example 1 to provide a 75:25 weight ratio mixture. The best previous performance was obtained with a benzoguanamine-formaldehyde condensate (the commercial product of this type CLA 1125 from American Cyanamid was used). To keep the same cross-link density, more CLA 1125 was needed, so the weight ratio of acrylic copolymer of Example 2 to CLA 1125 was 70:30. These combinations were diluted with water to 10% resin solids and the bath pH of 6.9 and bath conductivity of 650 micromhos was constant in the two baths. Electrodeposit at the cathode to produce a film 0.6 mil in thickness required a lower voltage in the invention (80 instead of 110 volts). Two cure schedules were used (20 minutes at 375° F. and 20 minutes at 350° F.). The same treated substrate (EP2 CRS) was used in both instances.

The results with the bisphenol-formaldehyde ether were better, especially at the lower baking temperature.

At the 375° F. bake, both coatings were solvent resistant, requiring over 100 double rubs with a methyl ethyl ketone saturated cloth before they were removed. However, after 168 hours of detergent testing, the benzoquanamine-cured coating was covered with blisters, while only a few blisters appeared on the bisphenol-cured coating.

At the 350° F. bake, the results were more dramatic. The benzoguanamine-cured coating resisted only 50 ketone double rubs, and there was total failure in the detergent test after only 80 hours. In contrast, the bisphenol-cured coating resisted 80 ketone double rubs, and after 80 hours of detergent testing, only a few blisters were formed.

I claim:

1. An aqueous coating composition which cures on baking comprising an aqueous dispersion of a reactive resin solubilized by salt formation, and a water insoluble bisphenol-formaldehyde ether as the curing reactant for said reactive resin, said reactive resin having functional groups reactive with the etherified methylol groups on said bisphenol-formaldehyde ether when a coating is baked.

2. An aqueous coating composition as recited in claim 1 in which said reactive resin is a copolymer containing from 5% to 40% of copolymerized reactive monomer, based on the weight of the copolymer.

3. An aqueous coating composition as recited in claim 1 in which said reactive resin is a solution copolymer containing copolymerized monoethylenically unsaturated carboxylic acid which is reacted with a volatile amine to form salt groups enabling dispersion in water.

4. An aqueous coating composition as recited in claim 1 in which said reactive resin is a solution copolymer containing copolymerized monoethylenically unsaturated amine which is reacted with a solubilizing acid to form salt groups enabling dispersion in water.

5. An aqueous coating compositon as recited in any of claim 3 or 4 in which the salt forming groups in said reactive resin are provided by monomer constituting from 5% to 35% of the copolymer.

6. An aqueous coating composition as recited in claim 5 in which said reactive resin is a copolymer containing from 10% to 30% of monoethylenically unsaturated monomer providing the hydroxy group.

7. An aqueous coating composition as recited in claim 1 in which water and water miscible organic solvent is present to provide a resin solids content of from 20% to 40% by weight.

8. An aqueous coating composition as recited in claim 1 in which water and water miscible solvent are present to provide a resin solids content of from 5% to 15% and thereby supply an electrocoating bath.

9. An aqueous coating composition as recited in claim 1 in which said bisphenol-formaldehyde is etherified with a $C_4$–$C_8$ alcohol.

10. An aqueous coating composition as recited in claim 9 in which the bisphenol used is bisphenol A.

11. An aqueous coating composition as recited in claim 10 in which the bisphenol A is tetramethylolated with formaldehyde.

12. A cationic electrocoating bath comprising water containing an amine copolymer which is a solution copolymer of monoethylenically unsaturated monomers comprising from 5% to 35% of copolymerized amine-functional monomer and from 5% to 40% of copolymerized monomer carrying a functional group reactive with the methylol group, said amine copolymer being dispersed in water by salt formation with a solubilizing acid, and a water insoluble bisphenol-formaldehyde ether as the curing reactant for said amine copolymer, said bath having a resin solids content of from 5% to 15%.

13. An electrocoating bath as recited in claim 12 in which the bisphenol is tetramethylolated and is etherified with a $C_4$–$C_8$ alkanol.

14. An electrocoating bath as recited in claim 13 in which etherification is carried out in the presence of nitric acid and then alkali metal hydroxide is added to neutralize the acidity and produce a precipitate which is removed by filtration to remove contaminating salts.

* * * * *